(12) United States Patent
Eaton et al.

(10) Patent No.: US 7,762,049 B2
(45) Date of Patent: Jul. 27, 2010

(54) ELECTRIC MOWER HAVING TWO-MOTION ACTIVATION SYSTEM

(75) Inventors: Joshua D. Eaton, Athens (CA); Philip Cassidy, Kemptville (CA); Olga Makeev, Mallorytown (CA); Michael Andrew Milligan, Gananoque (CA); Richard P. Rosa, Kingston (CA); Florin Baetica, Brockville (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/347,072

(22) Filed: Dec. 31, 2008

(65) Prior Publication Data

US 2010/0162674 A1     Jul. 1, 2010

(51) Int. Cl.
*A01D 69/00* (2006.01)
(52) U.S. Cl. ...................................... 56/10.8; 180/19.3
(58) Field of Classification Search ................. 56/10.8, 56/11.3, 11.1, 11.7, 11.8; 180/19.3, 315, 180/334, 6.62, 333, 6.34, 6.5, 6.54, 6.58, 180/331, 323; 172/42
See application file for complete search history.

(56) References Cited

U.S. PATENT DOCUMENTS

| | | | |
|---|---|---|---|
| 3,982,082 A | | 9/1976 | Thorud et al. |
| 4,309,862 A | * | 1/1982 | Carlson ....................... 56/10.5 |
| 4,413,466 A | | 11/1983 | Beugelsdyk et al. |
| 4,430,848 A | * | 2/1984 | Wistrom ...................... 56/11.3 |
| 4,466,308 A | * | 8/1984 | Kester et al. .............. 74/483 R |
| 4,503,958 A | * | 3/1985 | Nishio ...................... 192/12 R |
| 4,667,459 A | * | 5/1987 | Scanland et al. ............. 56/11.3 |
| 4,753,062 A | | 6/1988 | Roelle |
| 4,833,935 A | | 5/1989 | Roelle |
| 4,930,369 A | * | 6/1990 | Barnard et al. ............ 74/480 R |
| 4,967,543 A | * | 11/1990 | Scag et al. ..................... 56/10.8 |
| 5,085,043 A | | 2/1992 | Hess et al. |
| 5,203,147 A | * | 4/1993 | Long ........................... 56/10.1 |
| 5,279,101 A | * | 1/1994 | Sueshige ..................... 56/11.5 |
| 5,375,674 A | * | 12/1994 | Peter ......................... 180/19.3 |
| 5,490,370 A | | 2/1996 | McNair et al. |
| 5,606,851 A | | 3/1997 | Bruener et al. |
| 5,619,845 A | | 4/1997 | Bruener et al. |
| 5,784,868 A | | 7/1998 | Wadzinski et al. |
| 5,806,374 A | | 9/1998 | Mizutani et al. |
| 5,937,622 A | | 8/1999 | Carrier et al. |
| 6,078,015 A | | 6/2000 | Martinez |

(Continued)

FOREIGN PATENT DOCUMENTS

WO     WO-96/05719 A2     2/1996

*Primary Examiner*—Árpád Fábián-Kovács
(74) *Attorney, Agent, or Firm*—Harness, Dickey & Pierce, P.L.C.

(57) ABSTRACT

An electric outdoor power machine includes a machine body supported by wheels and having an output member driven by a motor. The motor is powered by a source of electrical power such as a battery. An upright assembly extends from the machine body and has a gripping handle. A manual input member such as a bail handle is mounted adjacent to the gripping handle and is movable relative to the gripping handle between a deactivated position and an activated position. A control assembly that selectively communicates electric power to the output member includes a button supported by a housing on the upright assembly. The button is movable between an unactuated position and an actuated position. A button crank is coupled to the button and has an interface portion.

18 Claims, 9 Drawing Sheets

U.S. PATENT DOCUMENTS

| | | |
|---|---|---|
| 6,230,678 B1 | 5/2001 | Gracyalny et al. |
| 6,386,169 B1 | 5/2002 | Gracyalny et al. |
| 6,404,078 B1 | 6/2002 | Thomas et al. |
| 6,658,829 B2 * | 12/2003 | Kobayashi et al. ............ 56/10.5 |
| 6,668,529 B2 * | 12/2003 | Busboom et al. ............. 56/10.8 |
| 6,751,936 B2 | 6/2004 | Kucera et al. |
| 6,769,501 B2 * | 8/2004 | Iida et al. ................... 180/19.3 |
| 7,543,430 B2 * | 6/2009 | Kaskawitz et al. ............ 56/11.3 |
| 2002/0153179 A1 * | 10/2002 | Kobayashi et al. ......... 180/19.3 |
| 2006/0053763 A1 * | 3/2006 | Stover et al. ................. 56/16.7 |
| 2007/0101690 A1 | 5/2007 | Stover et al. |

* cited by examiner

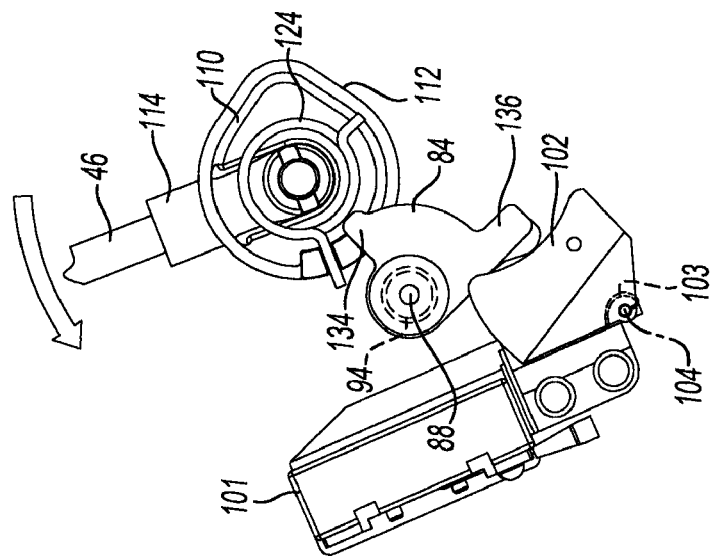
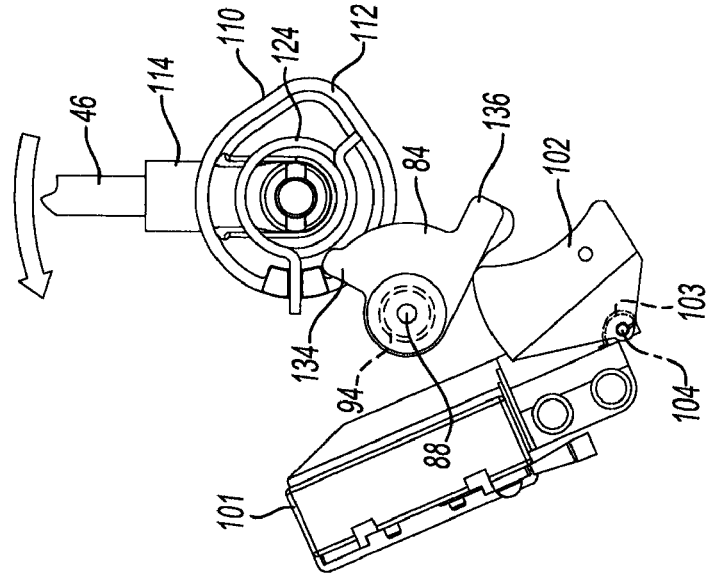
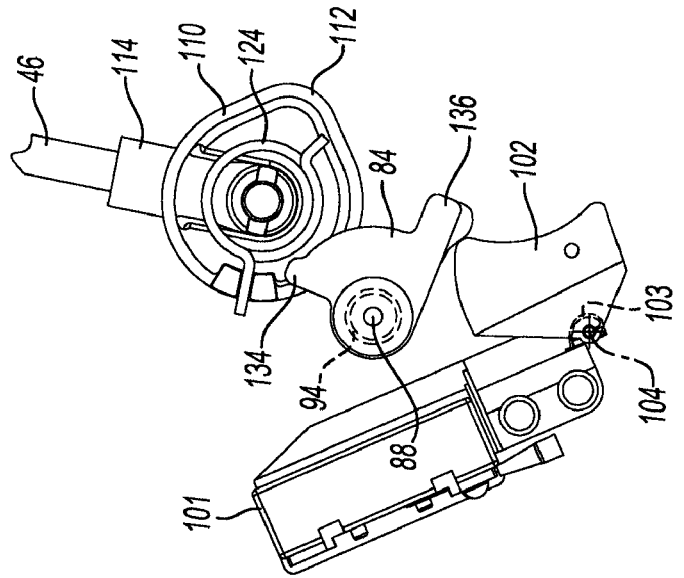

ELECTRIC MOWER HAVING TWO-MOTION ACTIVATION SYSTEM

FIELD

The present disclosure relates to electric outdoor power equipment and more specifically to an electric outdoor power machine having a two-motion activation system.

BACKGROUND

Due to concerns regarding urban air pollution, as well as other factors, electric outdoor power products such as lawnmowers are gaining in popularity. In some instances, due to the inconveniences and operating limitations of such corded electric outdoor power products, battery operated cordless power products can be preferred. Many outdoor products require a control system that must be manually actuated. In many instances due to regulatory requirement, such outdoor electric power products have a two-motion manual activation system. The two-motion manual activation system requires two separate actions to start the system.

SUMMARY

An electric outdoor power machine (for example a lawn mower) includes a machine body supported by wheels and having an output member driven by a motor. The motor is powered by a source of electrical power such as a battery. An upright assembly extends from the machine body and has a gripping handle. A manual input member such as a bail handle is mounted adjacent to the gripping handle and is movable relative to the gripping handle between a deactivated position and an activated position. A control assembly that selectively communicates electric power to the output member includes a button supported by a housing on the upright assembly. The button is movable between an unactuated position and an actuated position. A button crank is coupled to the button and has an interface portion. A switch has a switch input member that is movable between an "ON" position and an "OFF" position. In the "ON" position, the switch electrically connects the source of electrical power with the motor. A pawl extends from the bail handle. The switch is moved to the "ON" position by sequential movement of the button into the actuated position followed by movement of the bail handle from the deactivated position to the activated position. Movement of the button into the actuated position operably moves the interface portion of the button crank from an offset position relative to the pawl to an aligned position with the pawl such that movement of the bail handle to the activated position causes the pawl to move the interface portion into contact with the switch input member, which in turn moves the switch to the "ON" position.

According to other features, movement of the button from the unactuated position to the actuated position is precluded subsequent to movement of the bail handle to the activated position. The pawl is operatively aligned with and blocks the interface portion of the button crank from movement when the bail handle is moved to the activated position prior to movement of the button into the actuated position.

According to other features, the interface portion includes a first crank arm that rotatably engages the pawl and a second crank arm that rotatably engages the switch input member. The switch input member is a rocker switch that rotates about a rocker axis upon engagement with the second crank arm. The button crank is rotatably mounted about a button crank axle. The button crank slidably advances along the button crank axle toward the aligned position upon movement of the button from the unactuated position to the actuated position. The bail handle includes an upright post that defines a post axis. The bail handle rotates relative to an upright of the upright assembly about the post axis between the deactivated and activated positions. The button crank axle defines a button crank axis that is substantially parallel to the post axis. A biasing member biases the bail handle toward the deactivated position. The bail actuation control assembly further comprises a key that is removably positioned within a key receiver defined on the housing. The switch electrically connects the source of electrical power with the motor upon installation of the key into the key receiver.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 9 is a side view of the bail crank, button crank and switch assembly and shown with the bail handle in a deactivated position and a switch input member of the switch assembly in an "OFF" position;

FIG. 10 is a side view of the bail crank, button crank and switch assembly shown in FIG. 9 and illustrated with the bail handle being rotated from the deactivated position and toward an activated position;

FIG. 11 is a side view of the bail crank, button crank and switch assembly and shown with the bail handle rotated to an activated position and with the switch input member rotated to an "ON" position.

DETAILED DESCRIPTION

Figure 1:
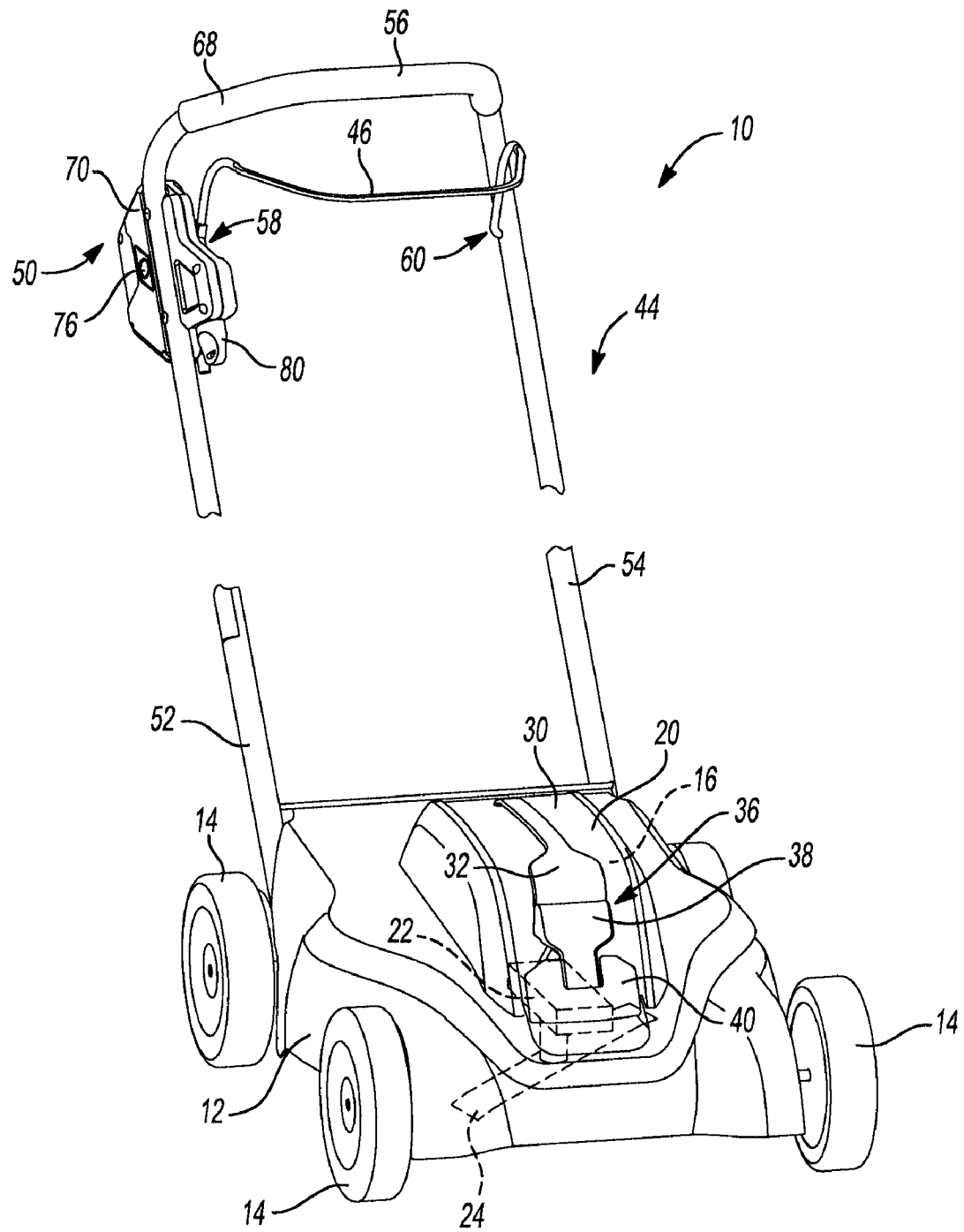
FIG. 1 is a front perspective view of an exemplary battery-powered lawn mower constructed in accordance to the present teachings.
Figure 2:
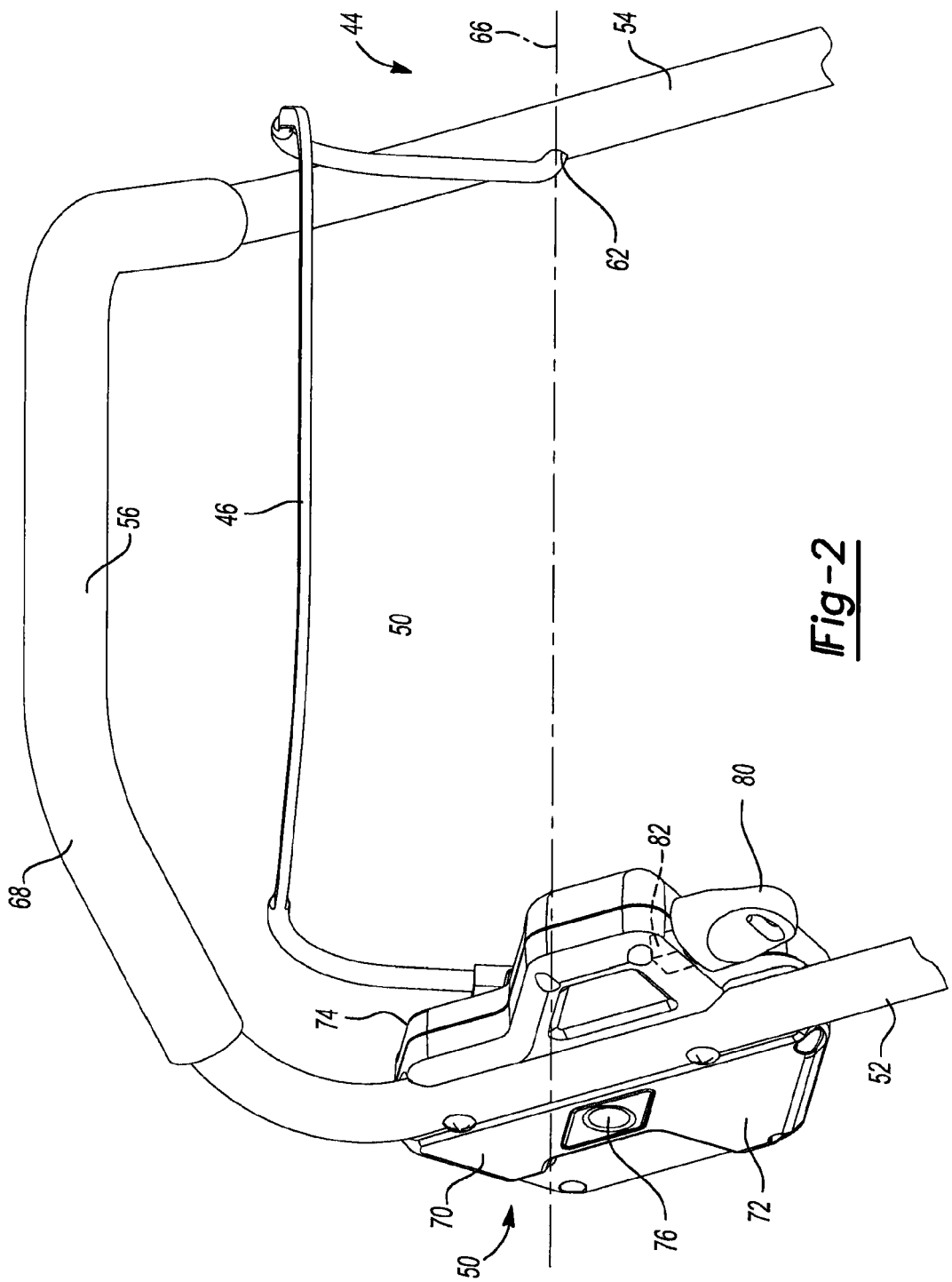
FIG. 2 is a front perspective view of an upright assembly having a bail handle and a bail actuation control assembly associated with the battery-powered lawn mower of FIG. 1.

With initial reference to FIGS. 1 and 2, an electric outdoor power machine in the form of a battery-powered lawn mower (hereinafter, mower) is shown and generally identified at reference numeral 10. While the following discussion is directed toward a battery-powered lawn mower, the teachings are also applicable to other electric corded or cordless outdoor power machines, such as, but not limited to, tillers, snow throwers, rotary mowers, edgers and power washers. The mower 10 includes a machine body or deck 12 supported by wheels 14. The deck 12 defines a battery pocket 16 on an upper end. A battery 20 is removably received within the battery pocket 16. A motor 22 is selectively powered by the battery 20 and drives an output member in the form of a cutting mechanism 24. The cutting mechanism 24 can include one or more blades (only one shown) mounted for rotatable motion within the deck 12.

The exemplary battery 20 includes a battery housing 30 that can be formed of rigid plastic for example. In one example, the battery housing 30 can include three battery cells (not specifically shown) that are connected in series, however, other configurations are contemplated. The exemplary battery 20 can be configured to provide 36 volts direct current (DC). It is appreciated that the battery 20 can be configured to provide other voltages. A handle 32 is formed on an upper end of the battery housing 30. A latch assembly 36 is provided on the deck 12 and includes a latch 38 and a lever 40. In general, the latch 38 and the lever 40 can rotatably cooperate to secure the battery 20 within the battery pocket 16 in an installed position (as illustrated in FIG. 1). Other features of the battery 20 including its operation and its electrical and mechanical compatibility with the exemplary battery-powered lawn mower 10 can be found in commonly owned and copending U.S. Patent Application Ser. No. 61/048,002, which is expressly incorporated herein by reference.

The mower 10 includes an upright assembly or handle 44, a manual input member or bail handle 46, and bail actuation control assembly 50. While the manual input member is shown in the form of a bail handle, it may take other forms such as a lever, a knob or other actuator that is movable by the operator. The upright assembly 44 generally includes a first and a second upright member 52 and 54, respectively, that connect at a gripping handle 56. The bail handle 46 generally includes a first end 58 that rotatably communicates with the bail actuation control assembly 50 and a second end 60 that is rotatably received in an opening 62 (FIG. 2) of the second upright member 54. As will be described in greater detail, the bail handle 46 is rotatably mounted relative to the upright assembly 44 for rotation along a bail axis 66. In one example, the gripping handle 56 includes a resilient gripping medium 68. The gripping medium 68 can comprise any compliant material such as foam for example.

Figure 3:
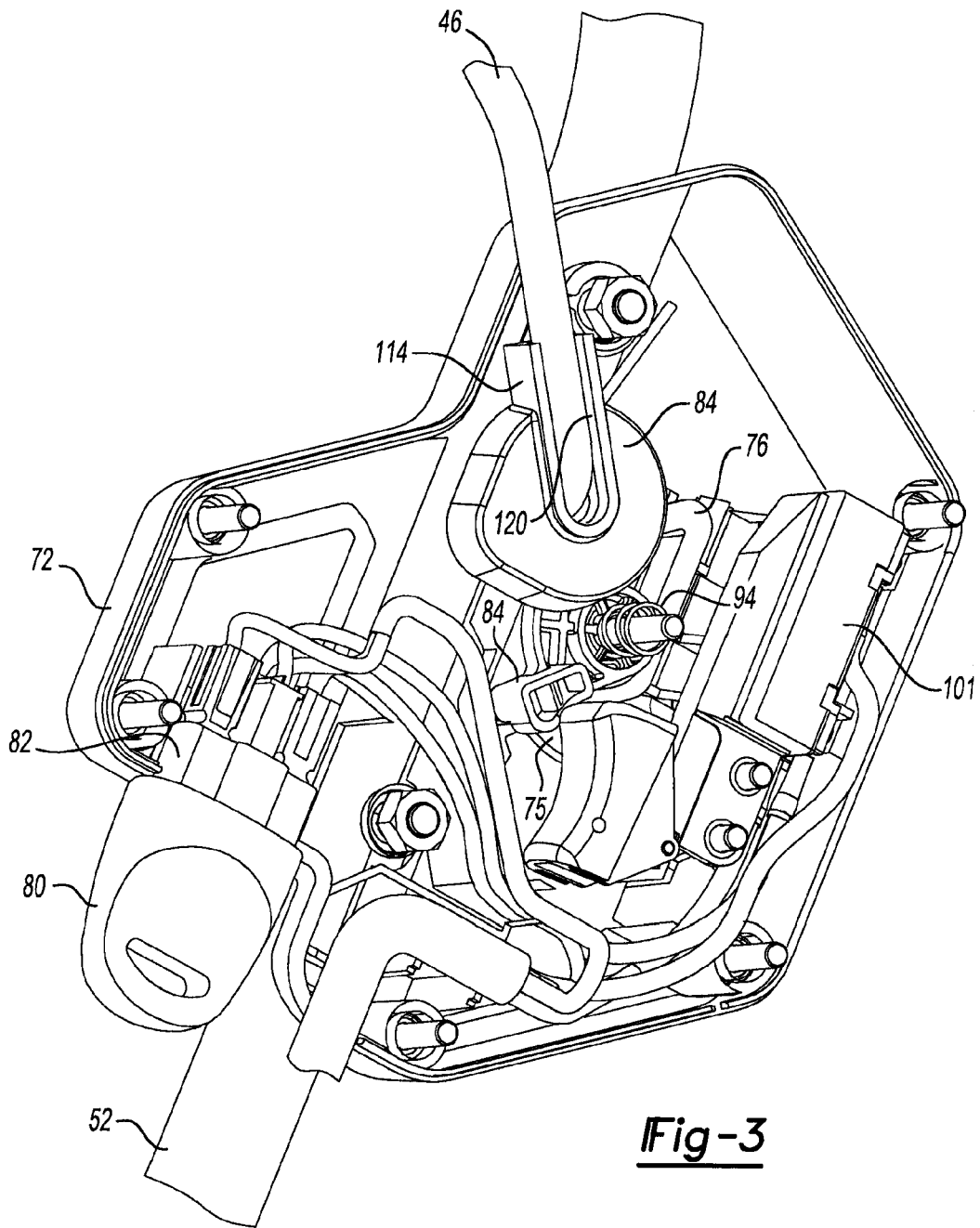
FIG. 3 is a side perspective view of the bail actuation control assembly of FIG. 2 and shown with a portion of the housing removed.

With continued reference to FIGS. 1 and 2 and additional reference now to FIG. 3, the bail actuation control assembly 50 will be described in greater detail. The bail actuation control assembly 50 generally includes a clam shell housing 70 having a first clam shell portion 72 and a second clam shell portion 74. The first clam shell portion 72 includes a rib 75 (FIG. 3) that extends in a direction generally transverse to the face of the button 76. A button 76 is movably supported by the housing 70 between an unactuated position (generally outward as shown in FIG. 2) and an actuated position (a depressed position). A key 80 is removably received within a key receiver 82 provided on the housing 70.

Figure 4:
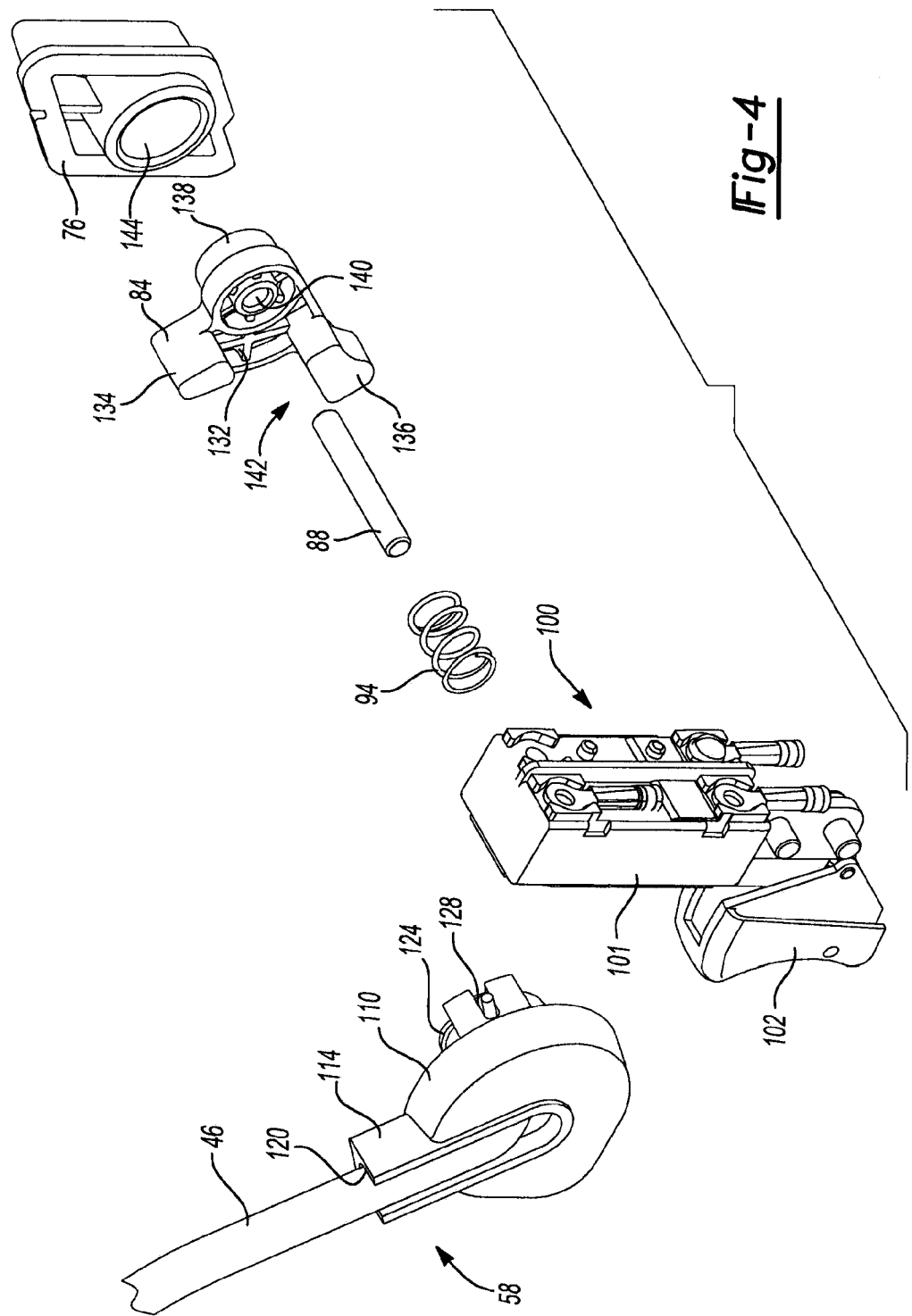
FIG. 4 is a partial exploded view of components associated with the bail actuation control assembly.
Figure 5:
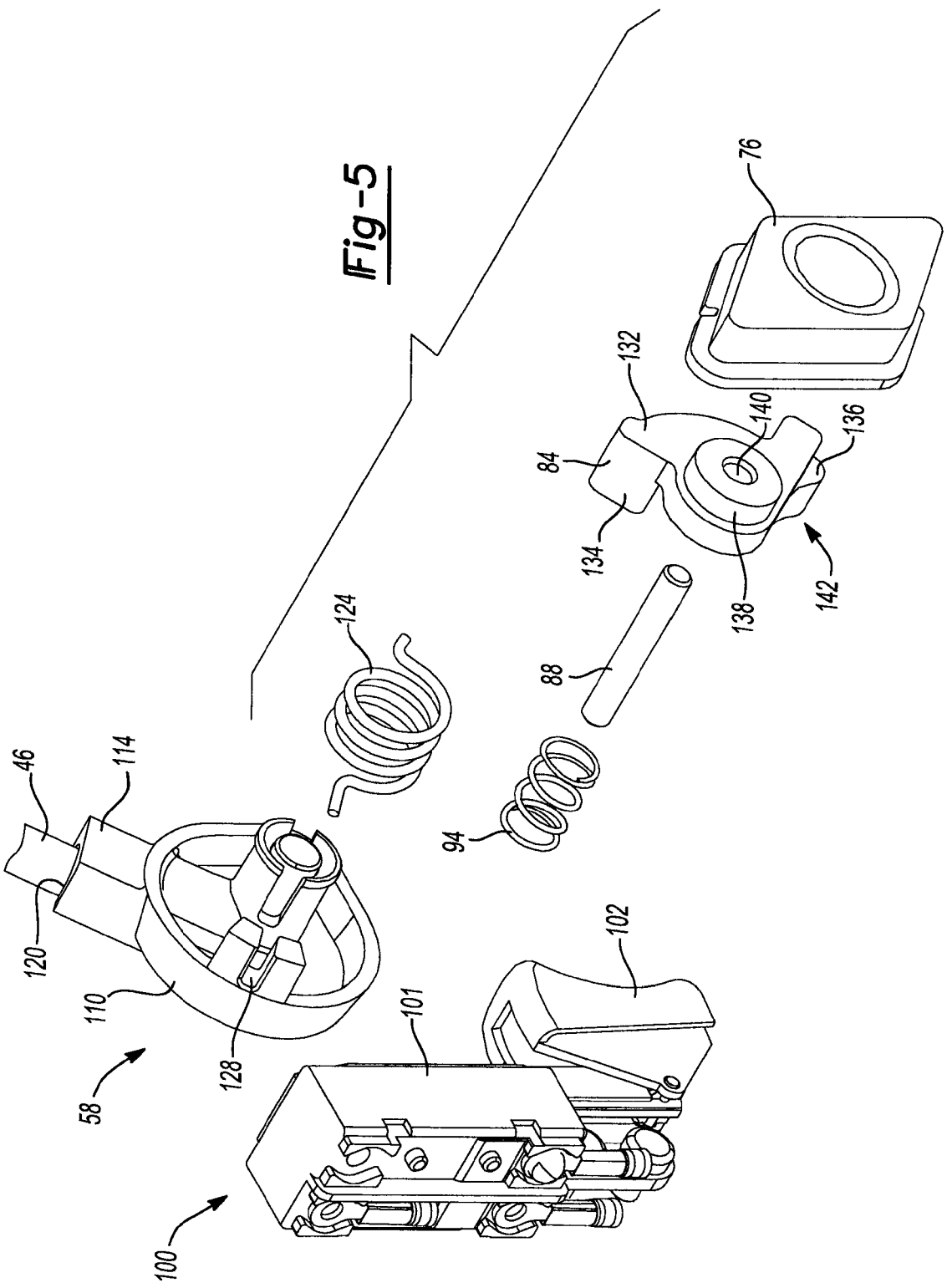
FIG. 5 is another exploded perspective view of the components shown in FIG. 4.

With further reference now to FIGS. 4 and 5, a button crank 84 is coupled to the button 76 and axially supported by an axle 88. As will be described in greater detail herein, the button crank 84 is both rotatable around a button crank axis 90 defined by the axle 88 and translatable along the axle 88. A button biasing member 94 urges the button crank 84 and therefore the button 76 toward the unactuated position (i.e., outwardly). A switch assembly 100 is supported within the housing 70. The switch assembly 100 includes a switch input member 102. The switch input member 102 can comprise any input member, such as a rocker switch as shown in the exemplary embodiment. The switch input member 102 is mounted for rotatable motion around a rocker axis 104 (FIG. 6).

Figure 6:
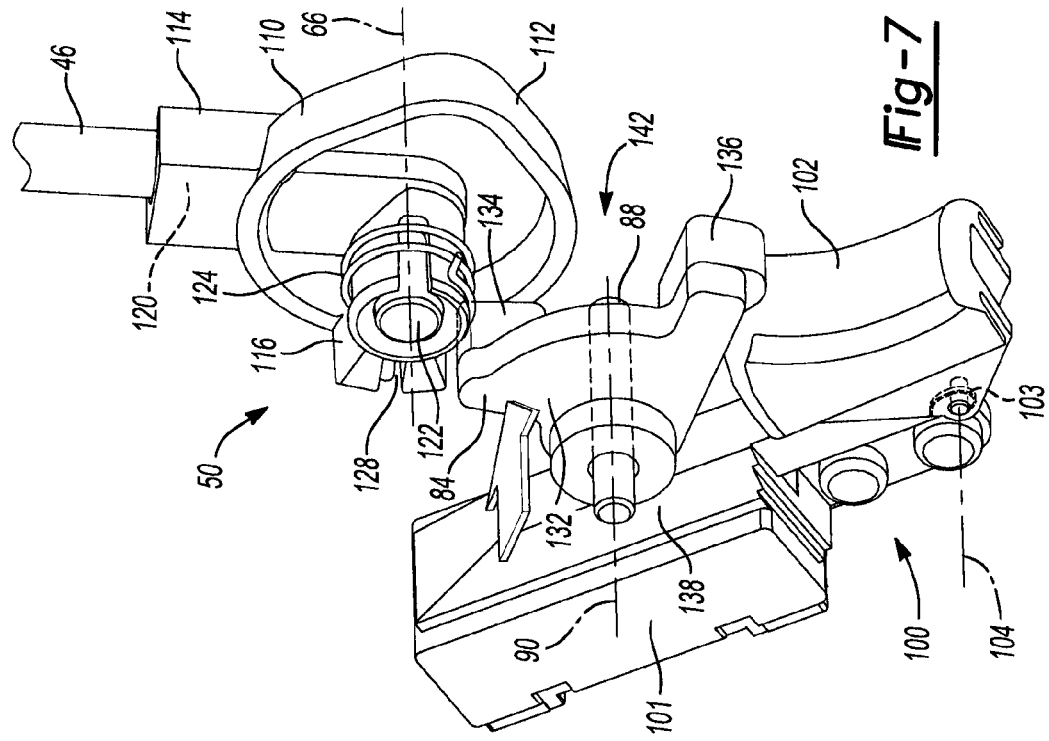
FIG. 6 is a side perspective view of a bail crank, a button crank, and a switch assembly of the bail actuation control assembly shown in FIG. 3 and illustrated with the button crank in an offset position relative to a pawl on the bail crank.
Figure 7:
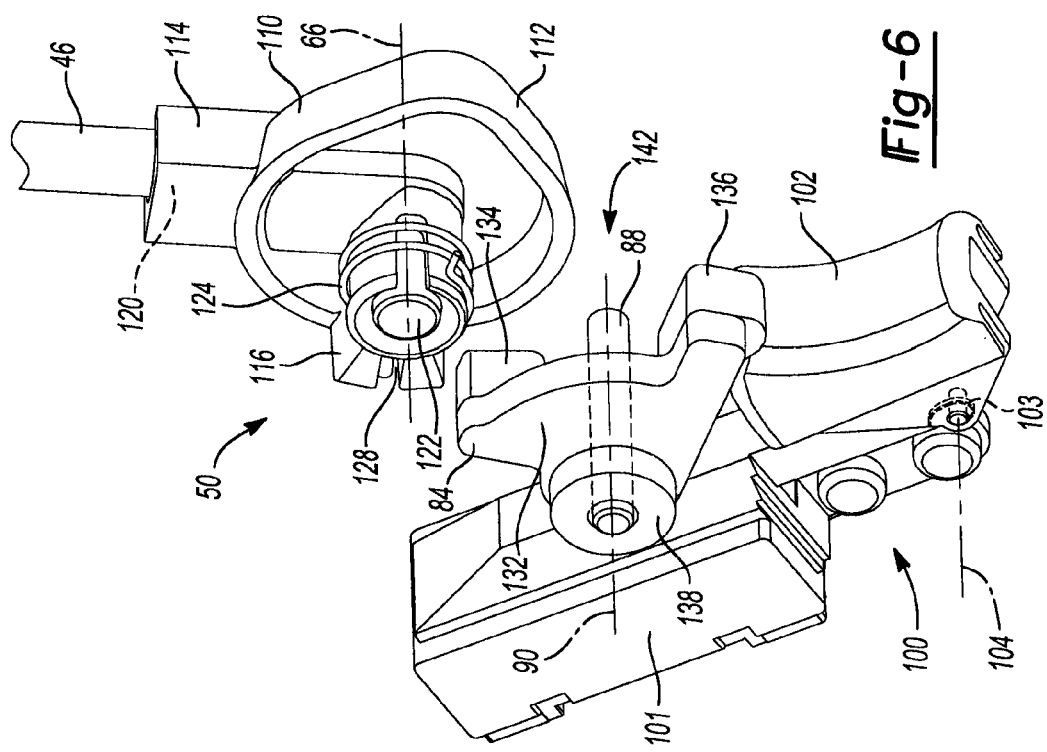
FIG. 7 is a side perspective view of the bail crank, button crank, and switch assembly shown in FIG. 6 and illustrated with the button crank in an aligned position with the pawl of the bail crank.
Figure 8:
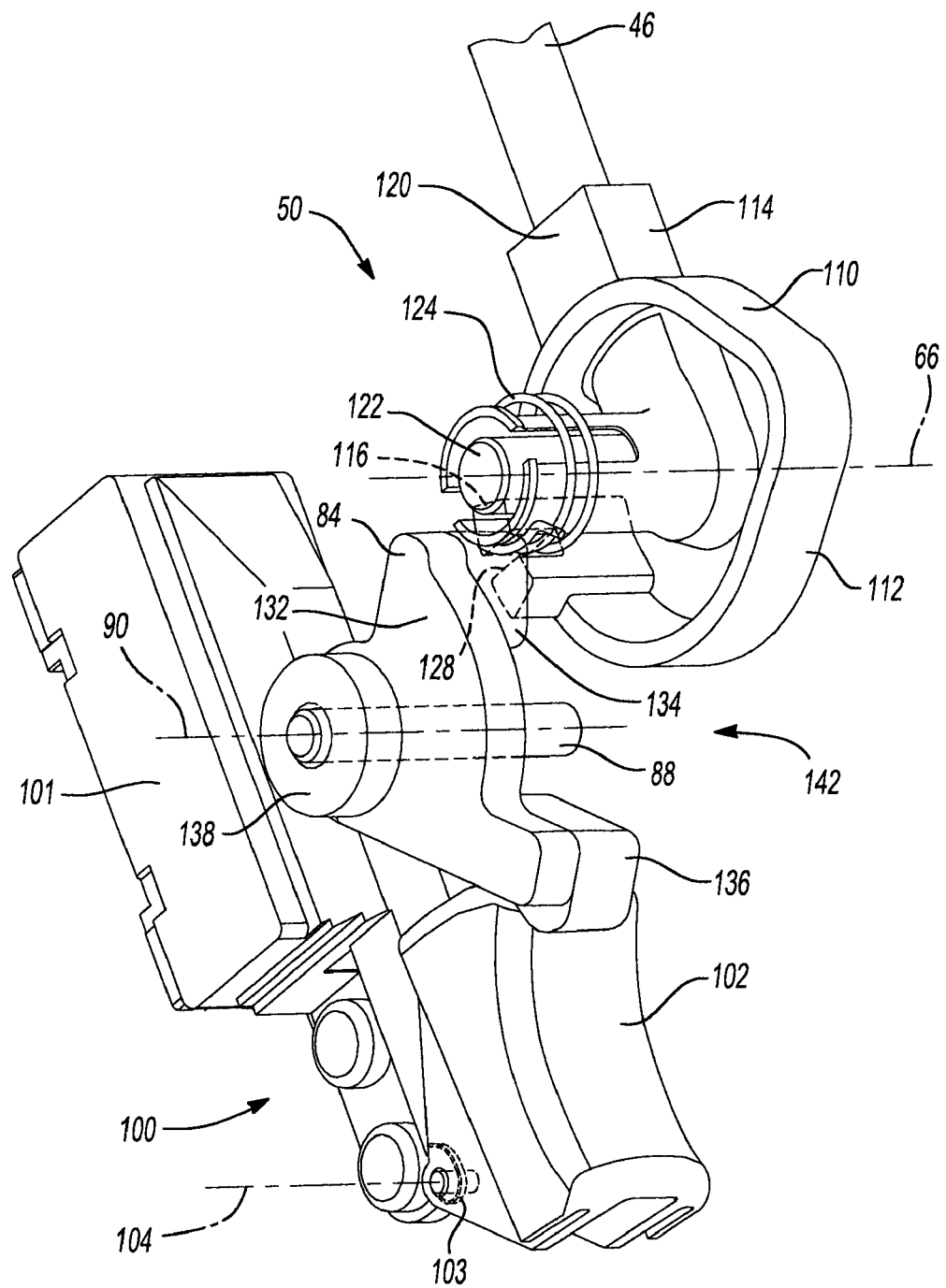
FIG. 8 is a side perspective view of the bail crank, button crank, and switch assembly shown in FIG. 6 and illustrated with the bail crank rotated prior to attempted translation of the button crank.

Turning now to FIGS. 6 and 7, a bail crank 110 is provided at the first end 58 of the bail handle 46. The bail crank 110 generally includes a crank body 112, a torsion arm 114 and a bail crank pawl 116. The torsion arm 114 can define a torsion arm slot 120 (see also FIG. 4) that selectively receives the bail handle 46. The bail handle 46 defines a bail post 122 formed generally at a right angle relative to a portion of the bail handle adjacent to the torsion arm 114. A bail biasing member 124 is journaled around a portion of the crank body 112. As will be described in more detail herein, the bail handle 46 is rotatable around the bail axis 66 defined through the bail post 122. The crank body 112 defines a slot 128 (see also FIG. 4) that receives one end of the bail biasing member 124. The opposite end of the bail biasing member 124 is statically mounted in the housing 70, such that the bail biasing member 124 biases the bail handle 46 toward a deactivated position (as shown in FIG. 1) or a position generally offset from the gripping handle 56.

The button crank 84 defines a crank body 132 having a first crank arm 134, a second crank arm 136 and a hub 138. An axle passage 140 is defined through the crank body 132 for receiving the axle 88. The first crank arm 134 and second crank arm 136 can collectively define an interface portion 142. A boss 144 defined in the button 76 receives the hub 138 of the button crank 84.

The bail actuation control assembly 50 according to the present teachings provides a two-motion manual activation system. The bail actuation control assembly 50 allows a user to actuate a two-motion system with the benefits of the bail handle 46. In order to activate the two-motion manual activation system, the user must, in sequence, first depress the button 76 from the deactivated position (FIGS. 1 and 6) to the actuated position (FIG. 7) followed by rotation of the bail handle 46 from the deactivated position (FIG. 9) to the activated position (FIG. 11).

With reference now to FIGS. 6-11, operation of the bail actuation control assembly 50 according to one example will be described. At the outset, a user can depress the button 76 (FIG. 2) causing the button 76 to urge the button crank 84 axially along the axle 88 in a direction along the button crank axis 90. Notably, as shown in FIG. 6, prior to depression of the button 76, the button crank 84 is normally biased outwardly (in the unactuated position) by the button biasing member 94 (FIG. 4). In the unactuated position (as shown in FIG. 6), the interface portion 142 of the button crank 84, or more specifically, the first crank arm 134, is laterally offset from the bail crank pawl 116. As a result, the bail handle 46 is free to rotate about the bail post axis 126 defined by the post 122 (or more generally about the bail axis 66, FIG. 2) prior to depression of the button 76 without making contact with the button crank 84.

As shown in FIG. 7, when the button 76 is depressed, the button crank 84 is slidably translated along the button crank axis 90 of the axle 88 into the actuated position. As shown, in the actuated position, the interface portion 142, or more specifically the first crank arm 134, is now laterally aligned with the bail crank pawl 116 of the bail crank 110. Next, a user can rotate the bail handle 46 from the deactivated position toward the activated position or more specifically in a counterclockwise direction around the bail post axis as viewed in FIGS. 9-11. Rotation of the bail handle 46 will cause the bail crank pawl 116 to rotatably engage the first crank arm 134 of the button crank 84 and therefore cause the button crank 84 to rotate in a clockwise direction around the axle 88 as viewed in FIGS. 9-11. Rotation of the button crank 84 in the clockwise direction around the axle 88 will cause the second crank arm 136 to rotatably engage the switch input member 102 and cause the switch input member 102 to rotate in a generally counterclockwise direction around the rocker axis 104 as shown in FIGS. 9-11. With the switch input member 102 rotated to an "ON" position as illustrated in FIG. 11, the switch 101 communicates power from the battery 20 to the cutting mechanism 24. As a further safety feature, the key 80 must be placed within the key receiver 82 (to complete an electrical loop) for the bail actuation control assembly to allow power to be delivered to the cutting mechanism 24.

Power cannot be communicated to the cutting mechanism 24 of the battery-powered lawn mower 10 by reversing the order of the actions, e.g. rotation of the bail handle 46 followed by depression of the button 76. Similarly, movement only of the bail handle 46 from the deactivated position to the activated position will not provide power to the battery-powered lawn mower 10 nor will only depression of the button 76 from the unactuated position to the actuated position. As illustrated in phantom in FIG. 8, if the bail handle 46 is first moved to the activated position, the first crank arm 134 is blocked from translating along the axle 88 by the pawl 116. Also as will be described, once the bail actuation control assembly 50 has been properly activated (the button 76 first depressed, followed by rotation of the bail handle 46 to the activated position), the user need not keep the button 76 depressed while the bail handle 46 is in the activated position.

When a user releases the bail handle 46, the bail biasing member 124 will urge the bail handle 46 into the deactivated position (or in a direction generally clockwise as viewed in FIGS. 9-11). Once the bail crank pawl 116 rotates in the clockwise direction, the rocker spring 103 urges the switch input member 102 in the clockwise direction causing the button crank 84 to rotate in the counterclockwise direction back to a position as shown in FIG. 9. Once the button crank 84 returns to a location as viewed in FIG. 9, the button crank 84 clears the rib 75 (FIG. 3) provided in the housing 70 such that the button biasing member 94 urges the button crank 84, and therefore the button 76, in a direction generally leftward (as viewed in FIG. 3) along the button crank axis 90 of the axle 88 as viewed in FIG. 6 into the unactuated position. When the second crank arm 136 is aligned with the rib 75 (i.e., when the button crank 84 is rotated to the position shown in FIG. 11), the rib 75 will block the button crank 84 and therefore the button 76 from returning to the unactuated position under the bias of the button biasing member 94. As can be appreciated, a user need not keep the button 76 depressed during operation.

Figure 12:
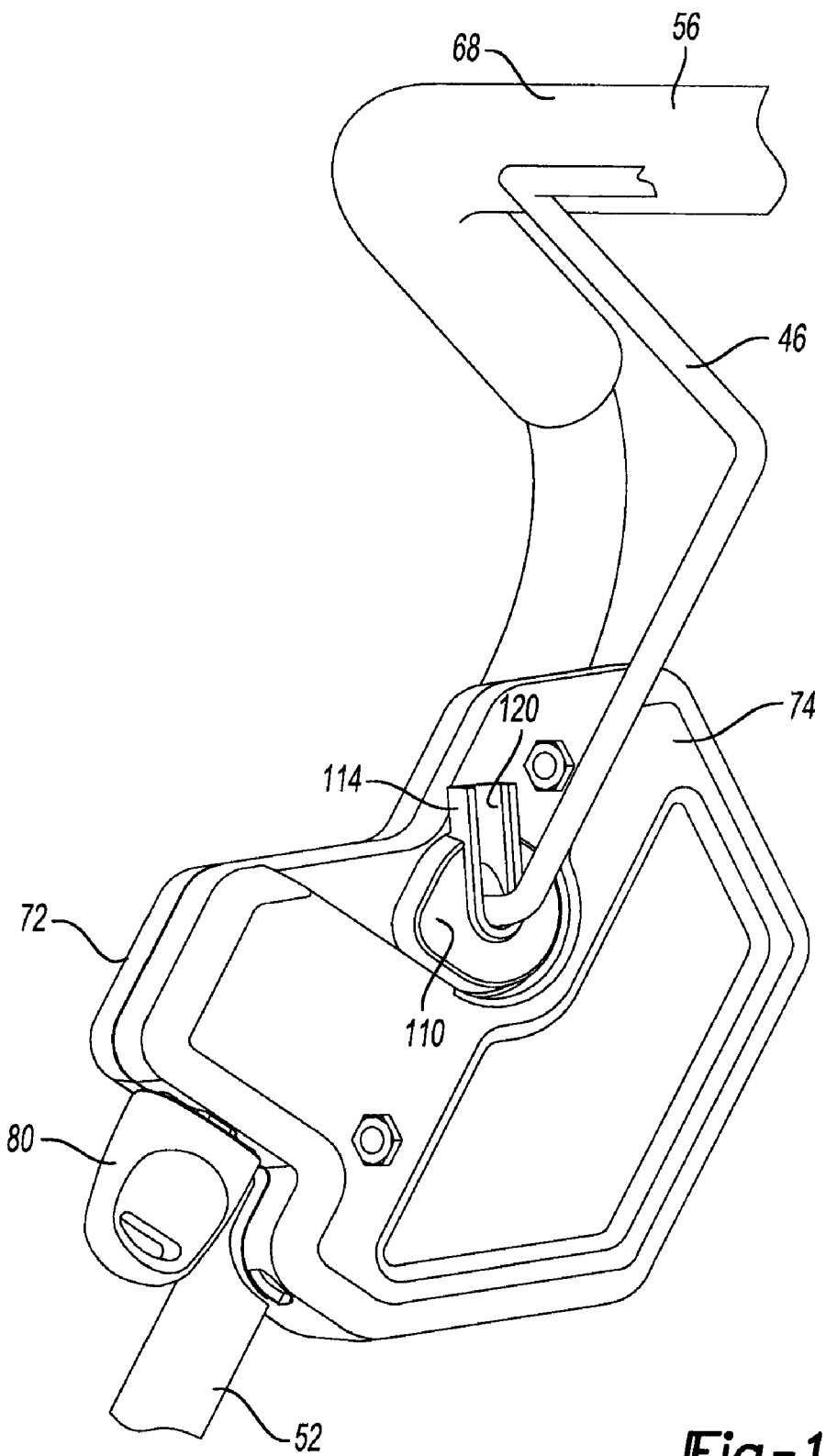
FIG. 12 is a front detailed perspective view of the upright assembly of FIG. 1 and shown with the bail handle moved away from engagement with the bail crank in a shipping position.

With reference now to FIG. 12, the bail handle 46 can be moved to a shipping position in a location generally against the gripping member 68. This allows the battery-powered lawn mower 10 to be shipped without placing stresses on the components of the bail actuation control assembly 50, such as any of the biasing members described herein while the battery-powered lawn mower 10 is shipped in its packaging. To move the bail handle 46 to the shipping position, as illustrated in FIG. 12, the bail handle 46 can be moved generally rightward as viewed in FIG. 12, such that the first end 58 of the bail handle 46 is moved away or disengaged from the torsion arm slot 120 of the torsion arm 114 of the bail crank 110. With the first end 58 of the bail handle 46 moved laterally away from the torsion arm slot 120, the bail handle 46 can be moved to a position alongside the gripping handle 56 without moving the bail crank 110 and therefore without moving any of the components associated with the bail actuation control assembly 50. To move the bail handle 46 back toward an operating position, as shown in FIG. 1, the bail handle 46 is rotated away from the gripping handle 56 and directed back into a nesting position within the torsion arm slot 120 of the torsion arm 114 provided by the bail crank 110.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. For example, while directional indicators such as leftward, rightward, clockwise and counterclockwise have been used herein, various components, such as associated with the bail actuation control assembly 50, can be configured for movement in other directions while still reaching similar results. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the disclosure without departing from the essential scope thereof. Therefore, it is intended that the disclosure not be limited to the particular embodiments illustrated by the drawings and described in the specification as the best mode presently contemplated for carrying out this disclosure, but that the disclosure will include any embodiments falling within the foregoing description and the appended claims.

What is claimed is:

1. An electric outdoor power machine comprising:
   a machine body supported by wheels and having an output member driven by a motor, the motor being powered by a source of electrical power;
   an upright assembly extending from the machine body and having a gripping handle;
   a manual input member adjacent to the gripping handle and movable relative to the gripping handle between a deactivated position and an activated position; and
   a control assembly that selectively communicates electric power to the output member, the control assembly comprising:
      a button supported by a housing on the upright assembly, the button movable between an unactuated position and an actuated position;
      a button crank coupled to the button and having an interface portion;
      a rocker switch that rotates about a rocker axis, the rocker switch having a switch input member movable between an "ON" position and an "OFF" position, wherein in the "ON" position, the rocker switch electrically connects the source of electrical power with the motor, the rocker switch further comprising a biasing member that biases the rocker switch toward the "OFF" position; and
      a pawl extending from the manual input member;
   wherein the rocker switch is rotated around the rocker axis to the "ON" position by sequential movement of the button into the actuated position followed by movement of the manual input member from the deactivated position to the activated position, wherein movement of the button into the actuated position operatively moves the interface portion of the button crank from an offset position relative to the pawl to an aligned position with the pawl such that movement of the manual input member to the activated position causes the pawl to move the interface portion into contact with the switch input member which in turn rotates the rocker switch to the "ON" position.

2. The electric outdoor power machine of claim 1 wherein movement of the button from the unactuated position to the actuated position is precluded subsequent to movement of the manual input member to the activated position.

3. The electric outdoor power machine of claim 2 wherein the pawl is operatively aligned with and blocks the interface portion of the button crank from movement when the manual input member is moved to the activated position prior to movement of the button into the actuated position.

4. The electric outdoor power machine of claim 1 wherein the interface portion includes a first crank arm that rotatably engages the pawl and a second crank arm that rotatably engages the switch input member.

5. The electric outdoor power machine of claim 1 wherein the button crank is rotatably mounted about a button crank axle and wherein the button crank slidably advances along the button crank axle toward the aligned position upon movement of the button from the unactuated position to the actuated position.

6. The electric outdoor power machine of claim 5 wherein the manual input member comprises a bail handle having an upright post that defines a post axis, wherein the bail handle rotates relative to an upright of the upright assembly about the post axis between the deactivated and activated positions.

7. The electric outdoor power machine of claim 5 wherein the button crank axle defines a button crank axis that is substantially parallel to the post axis.

8. The electric outdoor power machine of claim 1, further comprising a biasing member that biases the manual input member toward the deactivated position.

9. The electric outdoor power machine of claim 1 wherein the control assembly further comprises a key removably positioned within a key receiver defined on the housing, wherein the rocker switch electrically connects the source of electrical power with the motor upon installation of the key into the key receiver.

10. An activation system for an electric outdoor mower comprising:
a machine body having an output member driven by an electric motor;
a handle assembly extending from the machine body and having a gripping handle;
a bail handle rotatable relative to the gripping handle between a deactivated position and an activated position, the bail handle having a pawl extending therefrom;
a housing on the handle assembly having a button crank that has a first and a second crank arm, the button crank being rotatably mounted within the housing about a button crank axle and axially movable along the button crank axle wherein the first crank arm rotatably moves into and out of engagement with the pawl;
a switch having a switch input member that is rotatably engaged with the second crank arm and is movable between an "ON" position and an "OFF" position, wherein in the "ON" position, the switch electrically connects a source of electrical power with the output member;
a key removably positioned within a key receiver defined on the housing, wherein the switch electrically connects the source of electrical power with the motor upon installation of the key into the key receiver; and
wherein the switch is moved to the "ON" position by axial movement of the button crank into engagement with the pawl, and the bail handle is rotated to the activated position whereby the button crank is rotated into contact with the switch input member which turns the switch to the "ON" position.

11. The activation system for an electric outdoor mower of claim 10 wherein the bail handle must be in the deactivated position to move the button crank from the disengaged position to the engaged position.

12. The activation system for an electric outdoor mower of claim 11 wherein the pawl blocks the button crank from axial movement into the engaged position when the bail handle is in the activated position.

13. The activation system for an electric outdoor mower of claim 10 wherein the bail handle has an upright post that defines a post axis, wherein the bail handle rotates relative to the upright post about the post axis between the deactivated and activated positions.

14. The activation system for an electric outdoor mower of claim 13 wherein the button crank axle defines a button crank axis that is substantially parallel to the post axis.

15. The activation system for an electric outdoor mower of claim 10, further comprising a biasing member that biases the bail handle toward the deactivated position.

16. An activation system for an electric outdoor mower comprising:
a machine body having an output member driven by an electric motor;
a handle assembly extending from the machine body and having a gripping handle;
a bail handle rotatable relative to the gripping handle between a deactivated position and an activated position, the bail handle having a pawl extending therefrom;
a housing on the handle assembly having a button crank, the button crank being rotatably mounted within the housing about a button crank axle and axially movable along the button crank axle into and out of engagement with the pawl;
a switch movable between an "ON" position and an "OFF" position, wherein in the "ON" position, the switch electrically connects a source of electrical power with the output member;
wherein the switch is moved to the "ON" position by axial movement of the button crank into engagement with the pawl, and the bail handle is rotated to the activated position whereby the button crank is rotated into contact with the switch input member which turns the switch to the "ON" position; and
a key removably positioned within a key receiver defined on the housing, wherein the switch electrically connects the source of electrical power with the output member upon installation of the key into the key receiver.

17. A method of operating an electric outdoor power machine having a motor that drives an output member, the method comprising:
actuating a non-rotatable button supported on a housing of an upright assembly on the power machine, the non-rotatable button translating a button crank along a button crank axle from an offset position relative to a pawl of a manual input member to an aligned position with the pawl;

rotating the manual input member coupled to the upright assembly subsequent to actuating the non-rotatable button from a deactivated position to an activated position, the pawl operatively engaging the button crank relative to the non-rotatable button and rotating the button crank from a first position to a second position; and wherein rotation of the button crank to the second position causes the button crank to move a switch input member of a switch from an "OFF" position to an "ON" position, wherein in the "ON" position, the switch electrically connects the motor with a source of electrical power.

18. The method of claim 17 wherein actuating the non-rotatable button further comprises:

translating an interface portion of the button crank from the offset position relative to the pawl to the aligned position with the pawl such that rotating the manual input member to the activated position causes the pawl to rotate a first crank arm on the interface portion such that a second crank arm on the interface portion moves into contact with and rotates the switch input member.

* * * * *

UNITED STATES PATENT AND TRADEMARK OFFICE
CERTIFICATE OF CORRECTION

PATENT NO.        : 7,762,049 B2
APPLICATION NO.   : 12/347072
DATED             : July 27, 2010
INVENTOR(S)       : Joshua D. Eaton et al.

It is certified that error appears in the above-identified patent and that said Letters Patent is hereby corrected as shown below:

Column 7,

Line 35, "claim 5" should be -- claim 6 --.

Column 9,

Lines 4-5, "relative to the non-rotatable button and rotating the button crank" should be
--and rotating the button crank relative to the non-rotatable button --.

Signed and Sealed this

Ninth Day of November, 2010

David J. Kappos
*Director of the United States Patent and Trademark Office*